(12) United States Patent
Lee et al.

(10) Patent No.: US 6,915,292 B2
(45) Date of Patent: Jul. 5, 2005

(54) METHOD FOR UPDATING MULTIMEDIA FEATURE INFORMATION

(75) Inventors: Jin Soo Lee, Seoul (KR); Hee Youn Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 22 days.

(21) Appl. No.: 09/726,401

(22) Filed: Dec. 1, 2000

(65) Prior Publication Data

US 2001/0003185 A1 Jun. 7, 2001

(30) Foreign Application Priority Data

Dec. 2, 1999 (KR) .................................. 10-1999-0054498

(51) Int. Cl.⁷ ............................................... G06F 17/30
(52) U.S. Cl. ........................ 707/3; 707/104.1; 704/501
(58) Field of Search .................. 707/3, 104.1; 704/501; 386/125

(56) References Cited

U.S. PATENT DOCUMENTS

| | | | |
|---|---|---|---|
| 5,835,667 A | * 11/1998 | Wactlar et al. ............. 704/501 |
| 6,208,804 B1 | * 3/2001 | Ottesen et al. ............. 386/125 |
| 6,347,313 B1 | * 2/2002 | Ma et al. ..................... 707/3 |
| 6,408,293 B1 | * 6/2002 | Aggarwal et al. ............ 707/3 |
| 6,411,724 B1 | * 6/2002 | Vaithilingam et al. ... 707/104.1 |

* cited by examiner

*Primary Examiner*—Charles Rones
*Assistant Examiner*—Hassan Mahmoudi
(74) *Attorney, Agent, or Firm*—Fleshner & Kim, LLP

(57) ABSTRACT

A method for updating multimedia feature information such as weight and reliability is provided. The method according to the present invention first performs a multimedia retrieval based on the previously used weight, receives one or more user feedback on a relevance of the retrieval, calculates a performance of the present retrieval, and updates reliability of the present multimedia feature in consideration of the calculated retrieval performance. On the basis of the updated reliability, the weight of the present multimedia feature is updated.

23 Claims, 2 Drawing Sheets

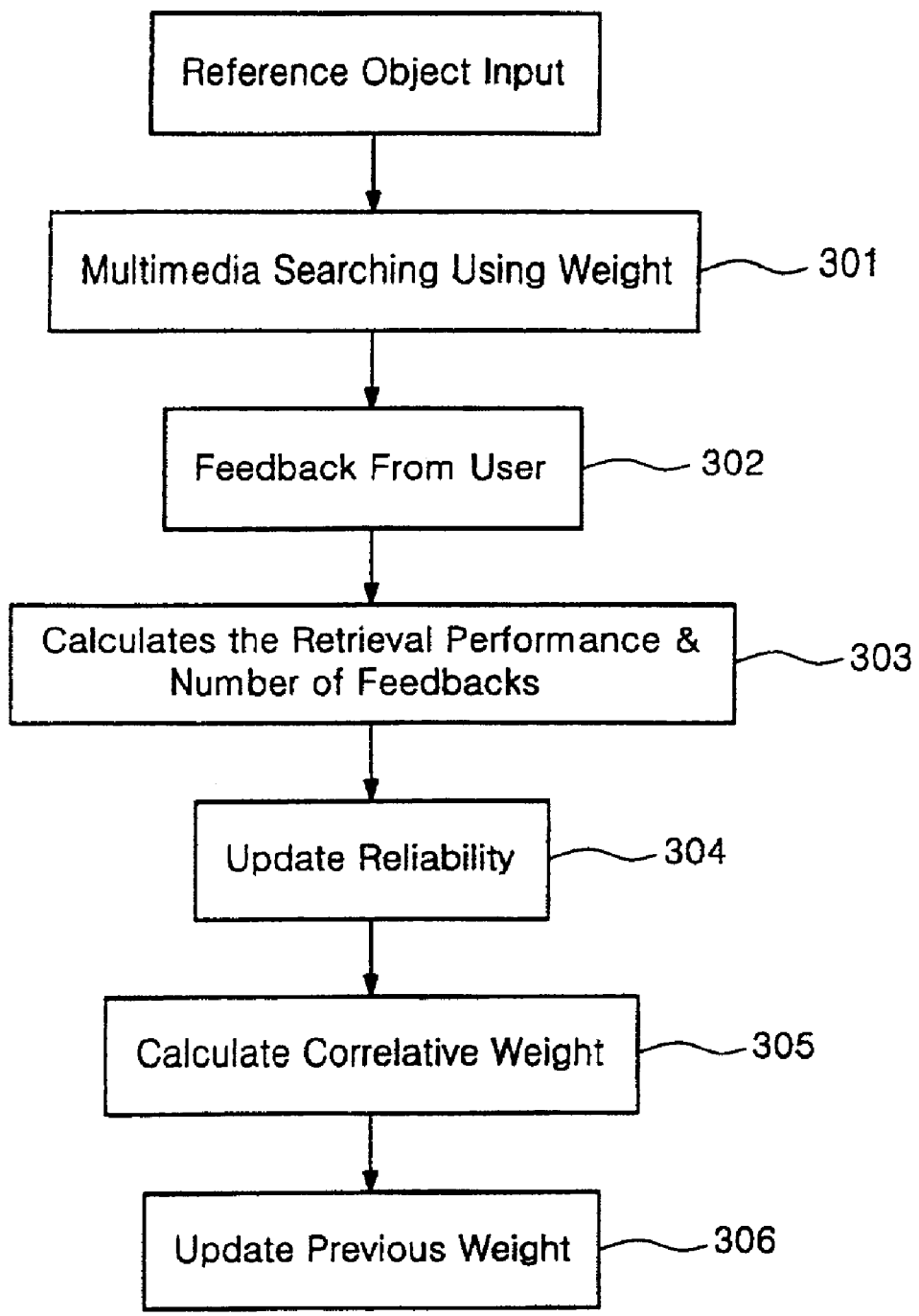

METHOD FOR UPDATING MULTIMEDIA FEATURE INFORMATION

BACKGROUND OF THE INVENTION (1) Field of the Invention

The present invention relates to a multimedia retrieval system, and more particularly to a method for updating multimedia feature information such as weights and reliability adaptively to reflect changes of multimedia retrieval environment and a data structure therefor.

(2) Description of the Related Art

Conventional content-based multimedia search technologies use various features such as color histogram and local color for image retrieval. However, the main features for distinguishing images differ from each other. So, various retrieval technologies using a specific weighted feature in each image are recently developed.

Some retrieval technologies provide user interface with dialog boxes such that users define weights of specific image features by themselves through the dialog boxes.

In these technologies, however, it is not easy for general users to set proper multimedia feature weights for image retrieval.

To complement the deficiency of the above retrieval technology, another technique called relevance feedback is used to determine weights of the image features.

In this method, a user browses images first, sorts the browsed images with respect to similarity and non-similarity to a target image, and then feeds back the sort results to the retrieval system. Responsive to the user feed back, the retrieval system automatically sets and adjusts the weights of the image features.

This method has an advantage that the retrieval system uses user feed backs and automatically set the weights of the image features.

In spite of this advantage, in this method the previously learned weight conditions may not contribute to continuous image retrieval as much as it were if the previously used method of similarity measure is changed.

If the method of similarity measure is changed, a new method of similarity measure may use different weight conditions in correlative or absolute ways, and so the learned weights information can be useless in worst case.

Accordingly, if the method of similarity measure is changed, the previous weight conditions should be updated so as to be adaptive to the changed environment.

While, if the weight conditions are learned in long stable environment without change, the stable weight conditions must not be easily changed by the new feedback information such that the retrieval performance is not degraded. And the weight conditions must be adaptive to the changed environment to provide a right retrieval result.

However, these requirements are not met in the retrieval technologies using the dialog box in which the user directly define the feature weight conditions or the relevance feedback in which the retrieval system automatically define the feature weight on the basis of the feedback information from the user.

SUMMARY OF THE INVENTION

The present invention has been made in an effort to solve the above problems of the conventional art.

It is an object of the present invention to provide a method for updating reliability of multimedia features on the basis of a retrieval performance calculated by user feedback considering a relevance of the previous multimedia retrieval.

It is another object of the present invention to provide a method for updating weights of the multimedia features on the basis of the updated reliability of the multimedia features.

The multimedia feature reliability is proportional to the retrieval performance and proportionally influenced in accordance with the number of relevance feedbacks such that the reliability is adjusted by the number of the relevance feedbacks participated in multimedia feature weight learning.

To achieve the above object, the multimedia feature information update method according to the present invention comprises the steps of: evaluating a retrieval performance using multimedia feature information; detecting change of retrieval environment based on the retrieval performance evaluation; and updating weight of the multimedia feature information and reliability of the weight by reflecting the retrieval performance evaluation and the retrieval environment change.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 3 is a flowchart for illustrating the multimedia feature update method.

DETAILED DESCRIPTION OF THE PREFERRED EMBODIMENTS

Figure 1:
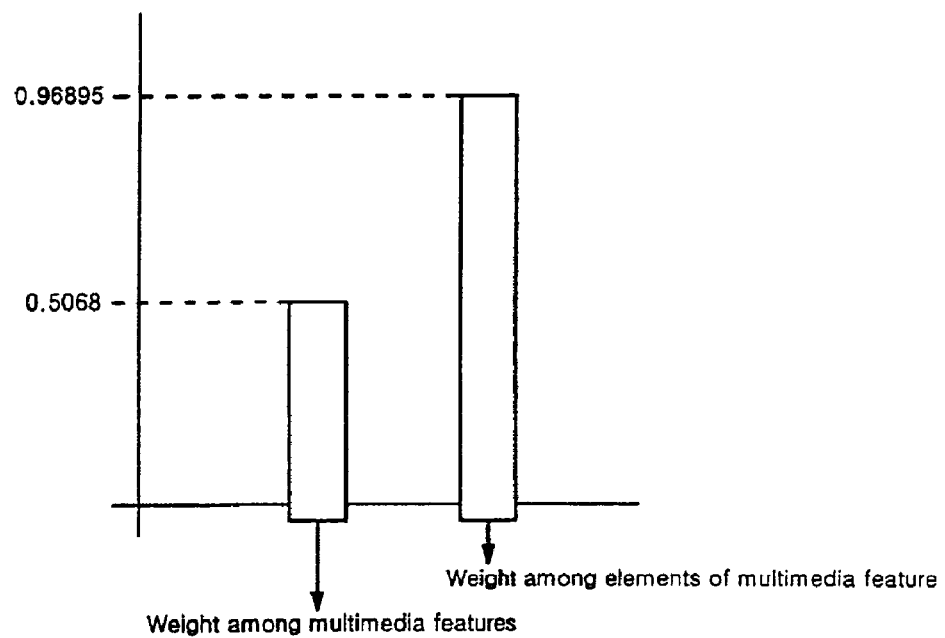
FIG. 1 is a graph showing a normalized distribution of values of correlative weights on the basis of the similarity using a plurality of relevance feedbacks.

Preferred embodiments of the present invention will be described hereinafter with reference to the accompanying drawings.

The present invention relates to a multimedia feature information update method capable of updating weights and reliability of multimedia features so as to be adaptive to multimedia retrieval environment changes, and a data structure therefor.

In the multimedia feature information update method of the present invention, the multimedia feature weights are quickly learned so as to be adapted to the retrieval environment change such that appropriate multimedia feature weights can be reflected with a small number of relevance feedbacks.

Also, the multimedia feature information update method of the present invention allows the multimedia object retrieval to be performed mainly on the basis of the multimedia data regardless to search engines or databases, using the environment-adaptable weight-learning mechanism through the reliability update.

Particularly, in the multimedia retrieval and multimedia feature information update system of the present invention, the multimedia feature information update method comprises the steps of (a) evaluating a retrieval performance of the previous retrieval using multimedia feature information, (b) detecting changes in the retrieval environment on the basis of the retrieval performance evaluation, and (c) updating the weights of the multimedia feature and the reliability of the weight information by reflecting the retrieval performance evaluation.

For example, when the multimedia feature weights and the reliability information on the multimedia feature weights are stored in the multimedia retrieval system according to the present invention, the present multimedia retrieval is performed with the previously stored multimedia feature weights and its reliability, and then a retrieval performance is calculated on the basis of user's feedback on the result of the present retrieval. Consequently, the reliability of the multimedia feature weights is updated in consideration with the present retrieval performance, and finally the present multimedia feature weights are updated on the basis of the updated reliability.

While the multimedia feature weights are updated in performing multimedia retrieval using the weights among the multimedia features and the weights among the elements in a multimedia feature, the multimedia feature weights learned with frequent feedbacks are less influenced by a new feedback and the recent feedback are much influenced by the multimedia feature weights update. Also, the weight-learning rate among the features is relatively higher than the weight-learning rate among the elements of the feature.

In the multimedia retrieval and multimedia feature weight update system using the multimedia feature weights and the reliability of the multimedia feature weights, the multimedia feature information structure is characterized in that a present multimedia retrieval is performed with previously stored multimedia feature weights and reliability thereof, and then a retrieval performance is calculated on the basis of user's feedback on the result of the present retrieval, consequently, the reliability of the multimedia feature weights is updated in consideration of present retrieval performance, and finally the present multimedia feature weights are updated on the basis of the updated reliability.

In the present invention, the reliability is high if a value of the calculated retrieval performance is higher than that of the previous retrieval performance, and the reliability is low if the value of the calculated retrieval performance is lower than that of the previous retrieval performance.

Also, the reliability of the multimedia feature weight is high if the value of the calculated retrieval performance is extremely high, and the reliability is low if the value of the retrieval performance is extremely low.

The more the number of feedbacks participated in calculating the present retrieval performance, the higher the retrieval performance influences to the reliability update.

Still also, the more the number of feedbacks participated in learning, the higher the reliability is.

In the multimedia retrieval and multimedia feature weight update system using the multimedia feature weights and the reliability of the multimedia feature weights, the multimedia feature information structure is characterized in that the multimedia feature weights learned with frequent feedbacks are less influenced by a new feedback and the recent feedback are much influenced by the multimedia feature weights update, and the weight-learning rate among the features are relatively higher than the weight-learning rate among the elements of the feature.

Now, the multimedia feature information update method and the multimedia feature information structure of the present invention will be described in detail.

As explained above, it is the method of the present invention to solve the problems relative to the contribution of the multimedia feature weights and the reliability of the multimedia feature weights to the multimedia object retrieval.

In the multimedia feature information update method and the multimedia feature information structure of the present invention, a multimedia retrieval is performed in accordance with the previously used weights and receives feedback from the user one or more times so as to calculate retrieval performance of the present retrieval result such that reliability of the present multimedia feature weights are updated in consideration of the calculated retrieval performance and update the present multimedia feature weights on the basis of the updated reliability.

In this multimedia feature information update method, the more times the previous feature weights are learned with the feedback from the user, the less the feature weights are influenced by new feedback, and the more recent the feedback is, the more the feedback influence to the feature weights update. Also, learning rate of the weights among the multimedia features is higher than that of the weights among elements of a multimedia feature.

Accordingly, in a multimedia retrieval system adapting the multimedia feature update method of the present invention, the multimedia data includes the reliability in addition to the feature weights. The reliability is expressed in a degree of how reliable the present feature weights are, and determine a degree of how the weights calculated on the basis of the present feedback influence to the update of the previously learned weights.

That is, the weights of high reliability are less influenced by the new feedback than the weights of low reliability.

Accordingly, in case when a retrieval environment such as the similarity measure is changed, the feature weights are quickly learned using the new feedback in the new retrieval environment by lowering the reliability of the previous weights. In case when the retrieval environment is maintained without change such that the weights are learn in long time and stable, the feature weights are not quickly changed by heightening the reliability of the previous weights.

The weights of the high reliability are less influenced than those of the low reliability in updating the weights, as seeing in following formula.

$$[\text{Reliability}^a \times Old\_W + Cur\_W]/[\text{Reliability}^a + 1]$$

a: constant, $0<a<1$, exponential term "a" in the formula for weights of feature is less than exponential term "a" in the formula for weights of the elements of a feature.

According to this multimedia feature update method, in the same condition, the more recent the feedback is, the more the feedback influence to weights update, and the weight learning rate among the features is relatively higher than that among the elements of the feature.

For example, the weight update among the features can be expressed like $[\text{Reliability}^b \times Old\_W + Cur\_W]/[\text{Reliability}^b + 1]$ ($0<b<1$), and the weight update among the elements of the feature and be expressed like $[\text{Reliability}^c \times Old\_ + Cur\_W]/[\text{Reality}^c + 1]$ ($0<c<1$) when $b<c$. These the condition in that the exponential term "a" in the formula for weights of features is less that the exponential term "a" in the formula for weights of elements of the feature is satisfied in the mathematical expression, $[\text{Reliability}^a \times Old\_W + Cur\_W]/[\text{Reliability}^a + 1]$.

In the mathematical expression of the weight update method, the denominator part is for normalization, and the value Old_W and Cur_W of the numerator part respectively indicate the previous and present weight values.

The value a (or b, c) is a constant fixed by an experiment such that the more recent the feedback is, the more the feedback influence to the weight update by the value a (or b, c).

That is, the present weights Cur_W as the recent feedback relatively much influence to $\text{Reliability}^{a(b,c)} \times Old\_W$, in condition of $0<a(b,c)<1$.

According to the weight update method, the learning rate of weight among the features is adapted higher than that of the weight among the elements of the feature.

That is, the value of $\text{Reliability}^b \times Old\_W$ is less than that of $\text{Reliability}^c \times Old\_W$ due to the conditions, $0<b<1$, 0<c<1, and b<c, such that Cur_W in the weight among the features influences to the weight update relatively more than Cur_W in the weight among the elements of the feature.

To adapt the learning rate of the weight among the features more than the learning rate of the weight among the elements of the feature means that the influence of the feedback to the weight update in one stage is greater to the weight among the elements of the feature than to the weight among the features.

The reason to adapt the learning rates of weight among the features and the weight among the elements of the feature differently is because the two kinds of features differently influence to the similarity. FIG. 1 shows the normalized distribution of the values of correlative weights on the basis of the similarity using a plurality of feedbacks in each case.

As shown in FIG. 1, the distribution of the weights among the features is smaller as much as ½ than the distribution of the weights among the elements of the feature.

In the present invention, the weight among the features, a, is ½ (b=½), and the weight among the elements of the feature, a, is 9/10.

Using the characteristics of the two kinds of the features during the weights learning process, the appropriate weights can be learned with reflecting the quick feedbacks.

In image retrieval, when a color histogram and grid color histogram are used as the features and bin values in the color histogram as elements, an optimal weight can be more quickly learned by giving a learning rate of the weight among the features higher than a learning rate of the weight among the elements of the feature.

When using the weight update method with the similarity, if the retrieval environment such as the similarity measure is changed, the optimal weight is quickly obtained using new feedbacks so as to be adapted to the new environment by lowering the reliability of the previous weight, and if the retrieval environment are maintained without change such that the weight is stable, the weight is not easily changed by the new feedbacks.

The reliability is updated according to the environment states by reflecting the following conditions.

1) Under the same condition, the more frequent the previous weight is learned by feedbacks, the present weight is not easily changed by giving the previous weight a higher reliability.
2) When the retrieval environment, such as a movement of a particular image to a different database or using a different similarity measurement, is changed, the weight learning is guided so as to quickly adapt to the changed environment by lowering the reliability of the previously learned weight.
3) In the case when the retrieval performance using the present weight is degraded or very low, the weight is given a low reliability although the weight is learned in long time.

This case is caused when an image feature has a bad retrieval factors or the weight loses its meaning as a weight by the change of the retrieval environment.

Oppositely, if the retrieval performance is higher or very high suing the present weight, the reliability goes higher.

The present retrieval performance can be obtained approximately from the user's feedbacks.

In this image retrieval system, a rate of the user's feedback image to the retrieval result can be used as a retrieval performance.

That is, if the image retrieval system provides 10 images as the result of the previous retrieval, and the user feeds 9 of them as similar images back to the system, the retrieval performance is 9/10.

The method for obtaining the retrieval performance is not limited, and various and efficient conventional or new methods can be considered.

Now, a reliability update method to realize the above-explained concept using the retrieval performance will be proposed as follows.

1) The more the feedback is, the more the retrieval performance calculated from the present feedback influences to the reliability. This is because the more the feedbacks from the user, the retrieval performance calculated from the user's feedbacks is accurate.
2) In a case when the retrieval performance is not high, the retrieval performance calculated from the present feedback influence to the reliability update in proportional to the reliability level.
3) If the present retrieval performance is higher than the previous retrieval performance, the reliability increases, and otherwise, the reliability decreases.

However, even if the present retrieval performance is higher than the previous retrieval performance, if the value is very low, the reliability does little increase, and even if the resent retrieval performance is lower than the previous retrieval performance, if the value is very high, the reliability does little decrease.

This means that even though the present retrieval performance is higher than the previous retrieval performance, in the case the reliability of the retrieval performance result is so low, the reliability should be maintained in low for reflecting correct retrieval performance.

This reliability update method can be expressed in the following formula.

$$\text{New\_}R = \text{Old\_}R(1+\text{Increase}R)+\alpha$$

$$\text{Increase }R = f(\text{\# of feedback}) \times (\text{Precision}(t)-\text{Precision}(t-1))$$

New_R: updated reliability.
Old_R: previous reliability.
Increase R: increment.
# of feedback: number of feedbacks at 1 retrieval.
Precision(t): accuracy (retrieval performance) calculated from the
present feedbacks.
Precision(t−1): accuracy (retrieval performance) calculated from the
previous feedbacks.
α: constant for making the reliability value proportional to the number of
feedbacks in the same condition.

In this reliability update method, the difference between the present and previous accuracies (retrieval performances) is multiplied by the f(# of feedback) so as to give the influence much weight.

Figure 2:
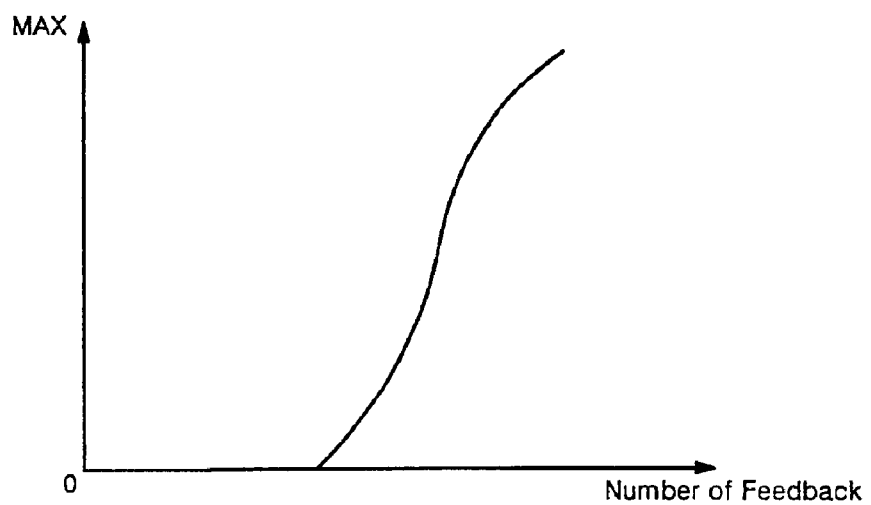
FIG. 2 is a graph for illustrating a relationship of the multimedia feature reliability and the number of relevance feedbacks using a Sigmoid function.

The function f(# of feedback) returns a value close to 0 when the number of the feedbacks is small, and increases the value as the number of the feedbacks increase (see FIG. 2). Generally, the function can be a modified Sigmoid function $\phi(x) = 1/[1+\exp^{-s(x-m)}]$.

The increment IncreaseR is expressed as a difference between the present and the previous retrieval performances for updating the reliability in proportional to the present retrieval performance.

That is, as the present retrieval performance Precision(t) is higher than the previous retrieval performance Precision(t−1), the difference value between the two retrieval performances increases and this increases the increment IncreaseR so as to give much large influence to the reliability update, and as the present retrieval performance Precision(t) is lower than the previous retrieval performance Precision(t−1), the difference value between the two retrieval performances decreases and this makes dull the increment IncreaseR so as to give less influence to the reliability update.

When the present retrieval performance is not high, the influence of the retrieval performance calculated from the present feedbacks to the reliability update is obtained not only by the increment IncreaseR but also by multiplying the previous reliability Old_R so as to update in proportional to the present reliability.

The addition of α (constant) is for the reliability value being proportional to the number of feedbacks even though the retrieval performance is not changed in the same condition.

In the place of the difference of the retrieval performances, the retrieval performances rate can be used for the reliability update method as follows.

New_R=Old_R(1+IncreaseR)+α

Increase R=[f(# of feedback)×((Precision(t)/Precision(t−1))−1)]

According to this reliability update method, as the present retrieval performance Precision(t) is higher than the previous retrieval performance Precision(t−1), the rate value IncreaseR increases and this increases so as to give much large influence to the reliability update.

That is, the increment IncreaseR is expressed as a rate of present retrieval performance to the previous retrieval performance to update the reliability in proportional to the present retrieval performance.

In this reliability update method, a rate of present retrieval performance to the previous retrieval performance is multiplied by the function f(# of feedback) so as to give much large influence as increasing the number of feedbacks participated in.

When the present retrieval performance is not high, the influence of the retrieval performance calculated from the present feedbacks to the reliability update is obtained not only by the increment IncreaseR but also by multiplying the previous reliability Old_R so as to update in proportional to the present reliability.

The addition of α (constant) is for the reliability value being proportional to the number of feedbacks even though the retrieval performance is not changed in the same condition.

FIG. 3 is a flowchart showing the reliability and the weight update method according to the present invention.

Once a reference object is input, a multimedia retrieval system performs multimedia retrieval using the previous weight in step 301, and then receive feedbacks to the retrieval result from a user in step 302.

Next, the multimedia retrieval system calculates the retrieval performance and number of the feedbacks using one or more feedbacks from the user in step 303, and consequently updates reliability on the present weight in consideration of the retrieval performance calculated in step 303 using one of the two method explained above, i.e., New_R=Old_R (1+IncreaseR)+α, Increase R=f(# of feedback)×(Precision(t)−Precision(t−1)) or New_R=Old_R(1+IncreaseR)+α, IncreaseR=[f(# of feedback)×((Precision(t)/Precision(t−1))−1)] in step 304.

Next, the multimedia retrieval system calculate a correlative weight using the present feedbacks in step 305, and finally, in step 306, updates the previous weight using the reliability updated in step 304 and the correlative weight calculated in step 305.

As described above, the more times the previous feature weights are learned with the feedback from the user, the less the feature weights are influenced by new feedbacks, and the more recent the feedback is, the more the feedback influence to the feature weights update. Also, learning rate of the weights among the multimedia features is higher than that of the weights among elements of a multimedia feature.

The step 305 can be performed in wherever between the step 302 and 306.

In the multimedia retrieval method using weight of the present invention, the quick weight learning is performed by effectively updating the weight and a reliability update method in consideration with the retrieval environment change is provided such that the shortcomings of the conventional multimedia retrieval method is compensated.

The quick weight learning of the present invention can provide optimal weight proper to the corresponding multimedia feature in spite of using a little numbers of feedbacks, superior retrieval performance to the conventional technologies, and enhances the practicality of the multimedia retrieval.

Also, the reliability update, which is another characteristic of the present invention, allows the multimedia object retrieval to be performed mainly on the basis of the multimedia data regardless to search engines or databases, using the environment-adaptable weight-learning mechanism through the reliability update.

What is claimed is:

1. A computer readable medium having stored therein a program, the program comprising:
    a first routine to determine weight among multimedia features and weight among elements of the multimedia feature; and
    a second routine to determine weight-learning rate of the weights among the multimedia features that is higher than a weight-learning rate of the weights among elements of a multimedia feature.

2. The medium of claim 1, wherein the weight is updated based on the following:
    the more times previous feature weights are learned with feedbacks from the user, the less the feature weights are influenced by new feedback; and
    the more recent feedback is, the more the feedback influence to the feature weights update.

3. The medium of claim 1, wherein the learning rate is in relation to the reliability formula, [Reliability$^a$×Old_W+Cur_W]/[Reliability$^a$+1] wherein, 0 <a<1, and exponential term "a" in the formula for weights of features is less than exponential term "a" in the formula for weights of elements of a feature.

4. A program storage device readable by a machine, tangibly embodying a program of instructions executable by the machine to perform a method for a multimedia retrieval using weight of the multimedia feature and reliability of the multimedia feature, said method comprising:
    updating a reliability of present weight by reflecting retrieval performance calculated using one or more user's feedbacks with respect to a multimedia retrieval result obtained using previous weight; and
    updating a present weight using the updated reliability.

5. The method of claim 4, wherein the present weight is updated using the one or more user feedbacks.

6. A method for updating multimedia feature information in a multimedia retrieval system using weight of multimedia features and reliability of the weight, comprising:
    (a) evaluating a retrieval performance using multimedia feature information;
    (b) detecting change of retrieval environment based on the retrieval performance evaluation; and
    (c) updating the weight of the multimedia feature information and reliability of the weight by reflecting the retrieval performance evaluation and the retrieval environment change.

7. The method as claimed in claim 6, wherein updating reliability of the weight is proportionally influenced by the retrieval performance.

8. The method as claimed in claim 6, wherein updating reliability of the weight is proportionally influenced by improvement of the retrieval performances.

9. The method as claimed in claim 8, wherein a reliability update rate is proportionally influenced by number of feedbacks participated in calculation of the retrieval performance.

10. The method as claimed in claim 8, wherein the reliability update is proportionally influenced by the difference between the present and previous retrieval performances.

11. The method as claimed in claim 8, wherein a reliability update is proportionally influenced by a ratio of the present retrieval performance to the previous retrieval performance.

12. The method as claimed in claim 6, wherein the reliability is calculated by a following formula:

previous reliability×(1+reliability increment)+α wherein, reliability increment: a function that multiplies the difference between the present and previous retrieval performance with the number of feedbacks.

α: constant for making the reliability value proportional to the number of feedbacks in same condition.

13. The method as claimed in claim 6, wherein the reliability is calculated by a following formula:

previous reliability×(1+reliability increment)+α wherein, reliability increment: a function that multiplies the rate of the present retrieval performance to the previous retrieval performance with the number of feedbacks.

α: constant for making the reliability value proportional to the number of feedbacks in same condition.

14. The method of claim 6, wherein the updating the weight of the multimedia feature information comprises:

updating the weights among the multimedia feature information; and updating weights among elements in a multimedia feature, wherein the multimedia weights learned with frequent feedbacks are relatively less influenced by a new feedback, and wherein recent feedback influences the multimedia weights relatively more than less recent feedback.

15. The method of claim 6, wherein the updating the weight of the multimedia feature information comprises determining a weight-learning rate among the multimedia features that is relatively higher than a weight learning rate among elements of a multimedia feature.

16. The method of claim 6, wherein the reliability is calculated by a formula:

previous reliability×(1+reliability increment)

wherein, reliability increment: a function that multiplies the difference between present and previous retrieval performance with a number of feedbacks.

17. The method of claim 6, wherein the retrieval performance is evaluated using the multimedia feature information for at least one multimedia item returned by a query of searchable multimedia items.

18. The method of claim 6, wherein the reliability is calculated by a formula:

previous reliability×(1+reliability increment)

wherein, reliability increment: a function that multiplies a rate of a present retrieval performance to a previous retrieval performance with a number of feedbacks.

19. The method of claim 6, wherein the updating the reliability of the weight comprises:

1) wherein when a feedback increases, the more the retrieval performance calculated from the feedback influences the reliability;

2) wherein when the retrieval performance is not high, the retrieval performance calculated from a present feedback influence to the reliability update is proportional to the reliability level; and 3) wherein when a present retrieval performance is higher than a previous retrieval performance, the reliability increases, and otherwise the reliability decreases.

20. A method for updating multimedia feature information in a multimedia retrieval system using weight of multimedia features and reliability of the weight, comprising:

retrieving multimedia using previous weight;

receiving one or more user feedbacks with respect to results of the multimedia retrieval;

calculating retrieval performance with respect to the results of present retrieval using the one or more user feedbacks;

updating a present weight using the one or more user feedbacks;

updating the reliability of the present weight by reflecting the calculated retrieval performance; and updating the present weight using the updated reliability.

21. The method of claim 20, wherein the results of the multimedia retrieval is a set of multimedia objects, and wherein the calculated retrieval performance is based on a plurality of multimedia objects in the set.

22. The method of claim 20, wherein the one or more user feedbacks independently update the present weight and the reliability of the present weight.

23. The method of claim 20, wherein said retrieving multimedia using previous weight comprises querying a searchable set including multimedia data using said previous weight.

* * * * *